United States Patent
Filgas

(10) Patent No.: US 8,977,097 B2
(45) Date of Patent: Mar. 10, 2015

(54) GLASS CORE PLANAR WAVEGUIDE LASER AMPLIFIER

(75) Inventor: Davis M. Filgas, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 449 days.

(21) Appl. No.: 12/658,906

(22) Filed: Feb. 17, 2010

(65) Prior Publication Data

US 2011/0200292 A1 Aug. 18, 2011

(51) Int. Cl.
| | |
|---|---|
| *G02B 6/10* | (2006.01) |
| *H01S 3/063* | (2006.01) |
| *G02B 6/12* | (2006.01) |
| *H01S 3/06* | (2006.01) |
| *H01S 3/0941* | (2006.01) |
| *H01S 3/16* | (2006.01) |
| *H01S 3/17* | (2006.01) |

(52) U.S. Cl.
CPC ............... *H01S 3/0632* (2013.01); *G02B 6/12* (2013.01); *H01S 3/0612* (2013.01); *H01S 3/0623* (2013.01); *H01S 3/0625* (2013.01); *H01S 3/09415* (2013.01); *H01S 3/1608* (2013.01); *H01S 3/1618* (2013.01); *H01S 3/1643* (2013.01); *H01S 3/17* (2013.01)
USPC .......................................... 385/129; 385/142

(58) Field of Classification Search
USPC ................................................. 385/129, 142
See application file for complete search history.

(56) References Cited

U.S. PATENT DOCUMENTS

| | | | | |
|---|---|---|---|---|
| 5,738,677 | A | * | 4/1998 | Colvard et al. ..................... 606/4 |
| 5,841,933 | A | * | 11/1998 | Hoaglin et al. ................ 385/142 |
| 5,852,622 | A | * | 12/1998 | Meissner et al. ................. 372/39 |
| 6,160,824 | A | * | 12/2000 | Meissner et al. ................... 372/7 |
| 6,895,152 | B2 | * | 5/2005 | Sumida et al. ................. 385/123 |

(Continued)

FOREIGN PATENT DOCUMENTS

| | | |
|---|---|---|
| WO | 99/33151 A1 | 7/1999 |
| WO | 2006/130180 A2 | 12/2006 |

OTHER PUBLICATIONS

Extended European Search Report of EP Application No. 11152772 dated Jul. 13, 2011 (5 pages).

(Continued)

*Primary Examiner* — Kaveh Kianni

(57) ABSTRACT

A planar waveguide with a glass core and a crystalline cladding. In a specific embodiment, the core is doped preferably with Neodymium, Ytterbium, or Erbium. In the best mode, the core is athermal glass with a refractive index uniformity $10^{-6}$ or better and the crystalline cladding has a refractive index lower than that of the core by $10^{-4}$ to $10^{-3}$ with a refractive index uniformity of $10^{-4}$. The cladding has high transparency at pump and lasing wavelengths. The coefficient of thermal expansion of the cladding is close to that of the core. In illustrative embodiments, the cladding is Sapphire and the core is aluminate glass. In an alternative embodiment, the cladding is crystal quartz and the core—is phosphate glass. By utilizing different materials for the core and cladding, the properties of each are optimized. Use of glass for the core allows much more flexibility in tailoring the properties of the core and the PWG geometry readily accommodates the low thermal conductivity of a glass core because the overall thermal performance is dominated by the higher thermal conductivity of the crystalline cladding.

26 Claims, 3 Drawing Sheets

(56) References Cited

U.S. PATENT DOCUMENTS

| | | | |
|---|---|---|---|
| 7,042,631 B2 * | 5/2006 | Smith et al. | 359/333 |
| 7,193,771 B1 * | 3/2007 | Smith et al. | 359/333 |
| 7,822,091 B2 * | 10/2010 | Jackson et al. | 372/49.01 |
| 2003/0012534 A1 * | 1/2003 | Sumida et al. | 385/123 |
| 2003/0063884 A1 * | 4/2003 | Smith et al. | 385/129 |
| 2004/0008405 A1 * | 1/2004 | Pelouch et al. | 359/341.3 |
| 2007/0047885 A1 * | 3/2007 | Mayer et al. | 385/114 |
| 2008/0232761 A1 * | 9/2008 | Kumaran et al. | 385/142 |
| 2009/0059966 A1 * | 3/2009 | Mayer et al. | 372/6 |
| 2010/0154877 A1 * | 6/2010 | Bhagavatula et al. | 136/256 |
| 2010/0159242 A1 * | 6/2010 | Bhagavatula et al. | 428/375 |

OTHER PUBLICATIONS

Saint Gobain Crystals, "Properties & Benefits of Sapphire: A Quick Reference Guide," (4 pages).

CRI Glass Prods. Div., "Real Glass Tech. Can Reduce the Heat Burden in the Gain Medium of Power Lasers by as Much as 20%,", Evanston, IL (2 pages).

Kigre, Inc., "Standards and Specs. of Kigre Rods," Hilton Head, SC (1 page).

Kigre, Inc., "QX Laser Glasses," Hilton Head, SC (1 page).

* cited by examiner

GLASS CORE PLANAR WAVEGUIDE LASER AMPLIFIER

BACKGROUND OF THE INVENTION

1. Field of the Invention

The present invention relates to optical devices. More specifically, the present invention relates to laser amplifiers.

2. Description of the Related Art

High-energy lasers are used in a variety of applications. For example, laser weapon applications currently require output power levels ranging from tens of kilowatts to a few megawatts. To date, only chemical lasers have been scaled to the megawatt level. Unfortunately, chemical lasers are very large and produce toxic byproducts making them unsuitable for many applications.

Compact, efficient, diode-pumped solid-state lasers have been considered for such high power applications. However, these lasers are typically limited to a few kilowatts per laser crystal due to both the limited size of available crystal materials and the challenges in removing the waste heat form the gain medium. These limitations have led to approaches to solid-state high-energy lasers (HELs), which require complex arrangements of large numbers of amplifiers in series or series/parallel configurations.

Planar waveguide geometry (PWG) has emerged as a gain medium geometry well-suited suited to extending the output power from a single solid-state laser module to the MW level, but available materials and fabrication processes are a limitation to the ultimate PWG size and output power. Fabrication of planar waveguides capable of high average power is currently a slow process and has only been scaled to relatively short (approximately 250 mm) lengths due to the lack of growth processes for longer YAG (yttrium-aluminum-garnet) material. Bulk single crystal materials that are available in larger sizes do not have suitable properties for scaling to high power laser operation. Ceramic YAG offers long term potential for availability in larger sizes, but scatter and absorption losses in ceramic YAG are still higher than desired and ceramic YAG material is currently limited to about 350 mm in length.

Some applicable fabrication processes have been developed. Onyx Optics developed a proprietary 'adhesive free' bonding process for bonding optical materials. Onyx Optics has fabricated some all Yttrium-Aluminum-Garnet (YAG) planar waveguides up to 250 mm long and some sapphire-clad YAG planar waveguides up to 60 mm long. Similar processes have been demonstrated by Precision Photonics up to 100 mm length. Very small planar waveguide amplifiers have been created by diffusion doping of dopants into both crystalline and glass substrates. Unfortunately, none of these approaches appears to offer scalability to weapon-class power levels.

Hence, a need remains in the art for a system or method for a simple, safe, and yet effective system or method for generating high energy laser outputs at low cost.

SUMMARY OF THE INVENTION

The need in the art is addressed by a planar waveguide constructed in accordance with the present teachings. The inventive waveguide includes a glass core and a crystalline cladding disposed on opposite sides thereof.

In a specific embodiment, the core is doped preferably with Neodymium, Ytterbium, or Erbium. In the best mode, the core has a refractive index uniformity $10^{-6}$ or better and the refractive index of the cladding has of uniformity of $10^{-4}$ or better. The cladding has a refractive index lower than that of the core. The cladding has a refractive index lower than that of the core by $10^{-4}$ to $10^{-3}$. The cladding has high transparency at pump and lasing wavelengths. The coefficient of thermal expansion of the cladding is close to that of the core. In illustrative embodiments, the cladding is Sapphire and the core is an aluminate glass. In an alternative embodiment, the cladding is crystal quartz and the core is Phosphate glass.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
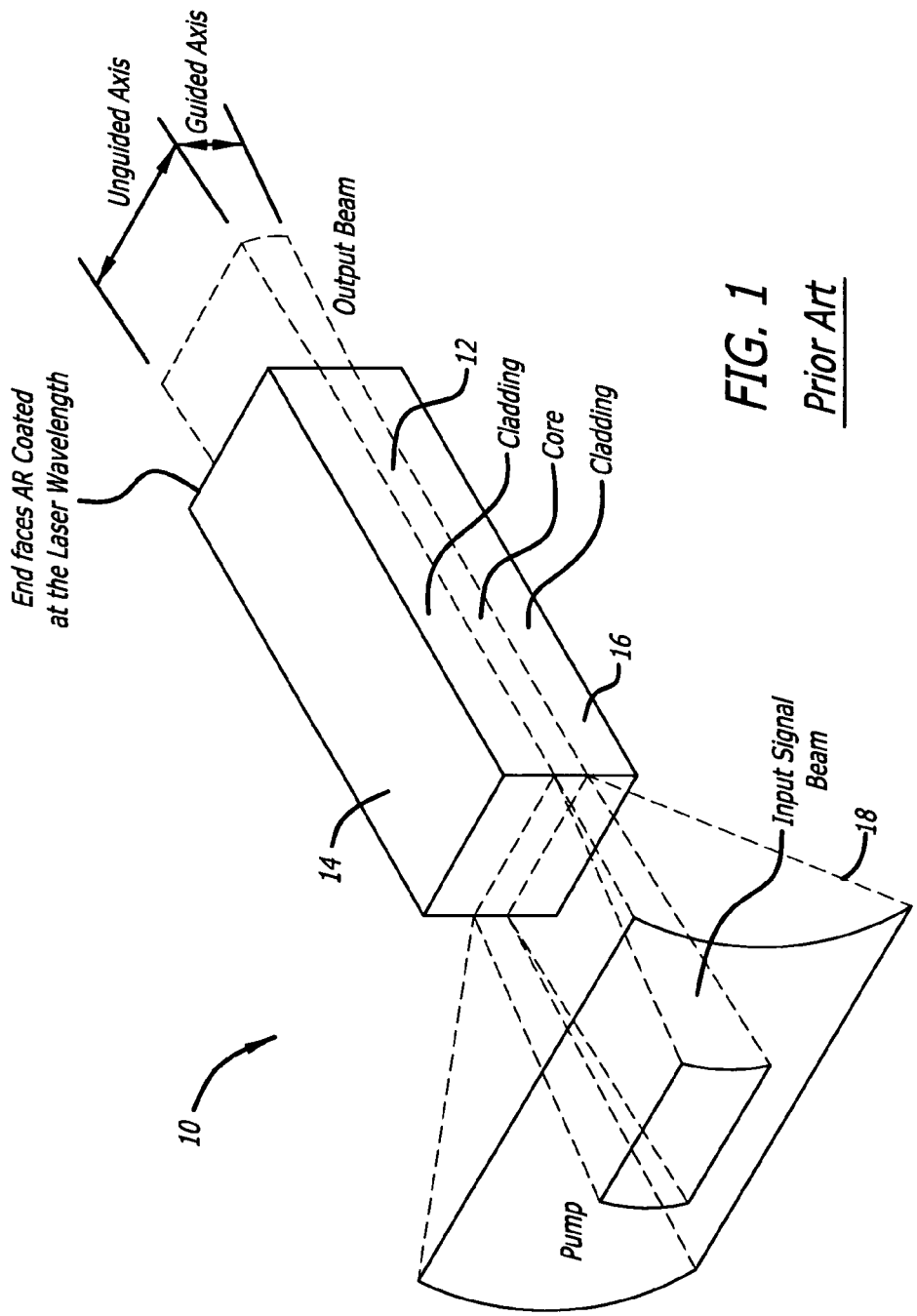
FIG. 1 is a simplified perspective view of a planar waveguide implemented in accordance with an illustrative embodiment of the present teachings.

FIG. 1 is a simplified perspective view of a planar waveguide implemented in accordance with an illustrative embodiment of the present teachings.

Figure 2:
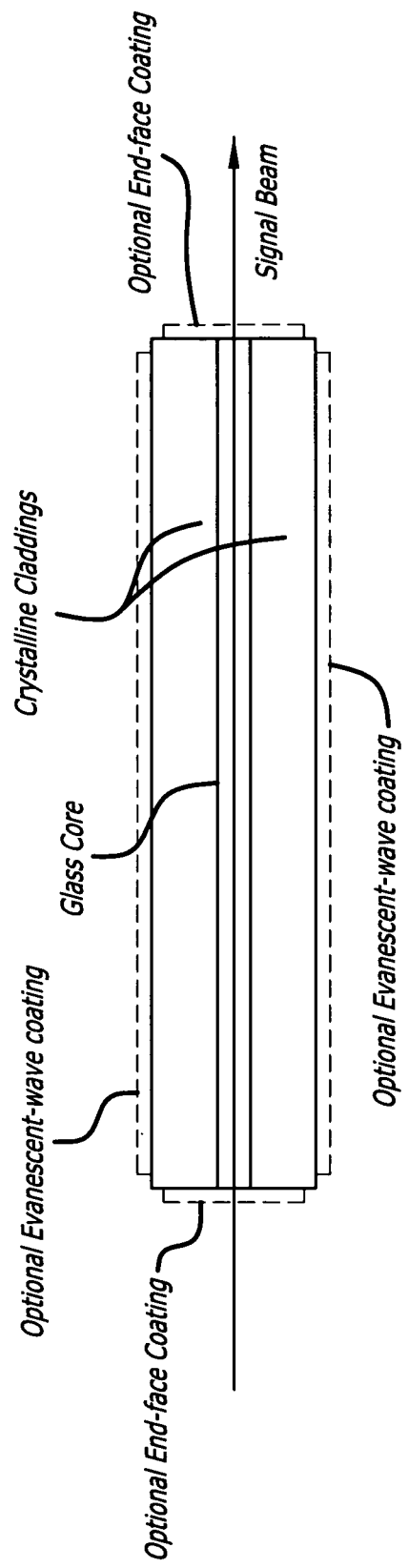
FIG. 2 is a sectional side view of the planar waveguide of the present invention.

FIG. 2 is a sectional side view of the planar waveguide of the present invention.

Figure 3:
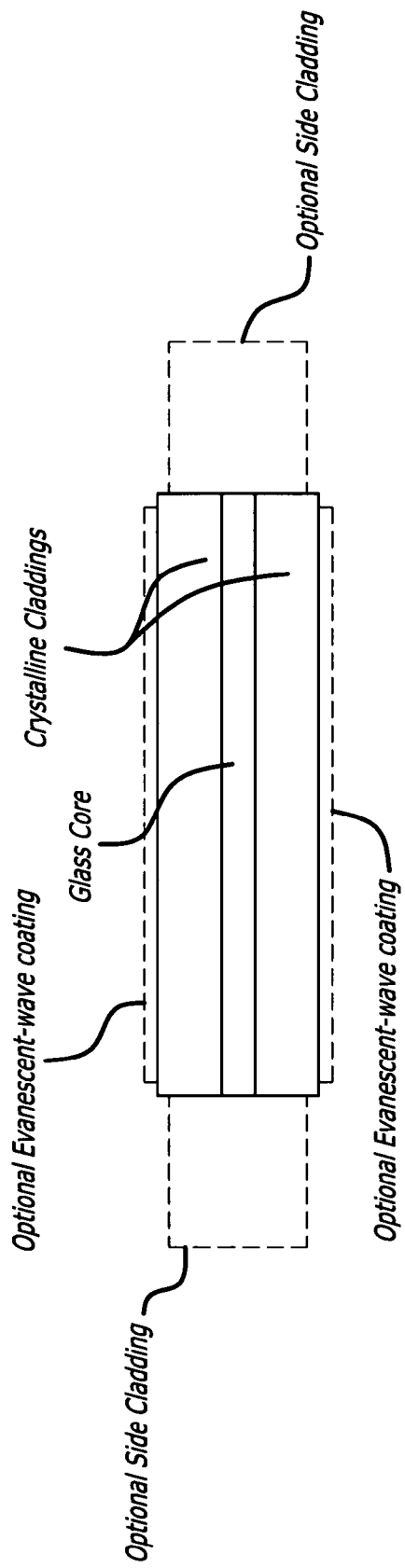
FIG. 3 is a sectional end view of the planar waveguide of the present invention.

FIG. 3 is a sectional end view of the planar waveguide of the present invention.

As shown in FIG. 1, the inventive planar waveguide 10 is a sandwich type structure consisting of a thin, sheet-like core 12 surrounded by upper and lower crystalline claddings 14 and 16 with a lower refractive index. The end faces are coated with an antireflection coating at the laser wavelength. Light propagating in the core 12 is guided in one axis by total internal reflection (TIR) at the core/cladding interface.

In the best mode, the cross-section of the core has a high aspect ratio, i.e., width:thickness of up to 100:1 or more. The large surface area to volume ratio of the PWG geometry is a key for efficient heat removal. Application of cooling to the large faces of a planar waveguide yields a very low thermal resistance between the PWG core and the coolant, minimizing temperature rise even for high heat loads and producing a largely one-dimensional thermal gradient in the PWG perpendicular to the plane of the core. For short (e.g. less that a few meter) lengths, straight PWG's with core sizes up to a few hundred microns can propagate single-mode beam quality in the guided axis with minimal distortion even if significant thermal gradients in the guided axis exist and even if the guide is not inherently single-mode. This 'athermal' behavior exists because the inherent divergence of the beam due to diffraction in the thin core is stronger than the thermal lensing effect.

The power handling capability of PWG's has been repeatedly proven through operation of planar waveguide lasers where the core is doped with a laser ion such as Neodymium (Nd), Ytterbium (Yb), or Erbium (Er).

The present invention combines a glass core with a crystalline cladding to enable the fabrication of planar waveguide laser amplifiers using material combinations which simplify the fabrication process, enable scaling to larger sizes and/or provide enhanced performance.

Inasmuch as the core in a planar waveguide is typically very thin, 200 microns or less, the thermal properties of the core have a very small impact on the overall thermal performance which is dominated by the thermal properties of the cladding. By utilizing different materials for the core and cladding, the properties of each can be optimized.

Use of glass for the core allows much more flexibility in tailoring the properties of the core and the PWG geometry readily accommodates the low thermal conductivity of a glass core. Glass materials are readily available in very large sizes (up to a few meters). Single crystal cladding materials such as sapphire are currently available in sizes up to two meters and have superior thermal conductivity, but sapphire cannot serve as a host for the most useful rare earth dopants: Nd, Yb, and Er. The lower melting point of glass materials enables the use of different fabrication processes such as rolling, flame polishing, and glass soldering which will enable fabrication of meter-long PWGs capable of megawatt output powers from a single device.

Optimal properties for the cladding material of a high-energy laser planar waveguide (HEL PWG) implemented in accordance with the present teachings are:
- high thermal conductivity (>10 w/m° C.),
- a refractive index lower than that of the core by a small amount (e.g. $10^{-4}$ to $10^{-3}$),
- good refractive index uniformity ($10^{-4}$ or better),
- high transparency (i.e. absorption and scattering losses less than 0.01%/cm) at both the pump and lasing wavelengths,
- availability in the required size,
- coefficient of thermal expansion (CTE) matched to the core within ~1 ppm/° C., and
- compatibility with some process for bonding to the core material.

Optimal properties for the core material of a HEL PWG implemented in accordance with the present teachings are:
- ability to serve as a host for the desired active lasing ion, preferably Neodymium (Nd), Ytterbium (Yb), or Erbium (Er),
- moderate thermal conductivity (>1 W/m° C.),
- very good refractive index uniformity ($10^{-6}$ or better),
- low thermo-optical distortion, (This is the change in optical phase with temperature resulting from two effects: the change in refractive index with temperature, dn/dT, and the change in path length due to thermal expansion. The ideal material would have produce no phase variations even in the presence of thermal gradients. To first order, this is achieved when $(n-1)*\alpha - dn/dT = 0$ where n is the refractive index, $\alpha$ is the coefficient of thermal expansion, and dn/dT is the temperature coefficient of refractive index)
- low absorption and scattering losses at the pump and lasing wavelengths (i.e. absorption and scattering losses less than 0.01%/cm),
- availability in the required size, and
- compatibility with some process for bonding to the cladding material.

There are many possible material combinations that provide most of these properties, but some fine-tuning of material properties is possible, especially with glass core materials. To date, YAG has been the most common host material for solid-state lasers due to its high optical quality, dopant compatibility, and high thermal conductivity.

The present invention greatly relaxes the need for high thermal conductivity in the doped core material. Glass laser materials, readily available from Schott, HOYA, Kigre and others can be fabricated with larger sizes, lower absorption and scattering losses, and better index uniformity than YAG. These glass materials have thermal conductivity about 10× lower than YAG that prevents them from being used at high average powers in conventional rod or slab geometries. However, the present invention enables the use of these materials at high average power because the thermal performance is dominated by the thermal properties of the cladding.

Many glass materials have been engineered to exhibit "athermal" behavior. This means that the CTE and dn/dT (rate of change of the index of refraction with respect to temperature) have opposite signs and have been optimized such that changes in temperature produce a negligible change in the OPD (Optical Path Difference). This feature could be utilized to minimize any degradation of the beam quality in the unguided axis of the PWG arising from thermal gradients in that direction.

Most laser glasses developed to date have refractive indices near 1.55 and belong to phosphate and silicate glass families. A crystalline cladding material with an appropriate refractive index and CTE for use with these types of glass is crystal quartz as its thermal conductivity is about 10× higher than the glass materials. High optical quality synthetic crystal quartz is available from a number of suppliers in lengths up to 200 mm.

Sapphire has been recognized as a superior cladding material for composite laser crystals and planar waveguides due to its high thermal conductivity, good optical properties, and availability. To date, it has been used as a cladding material for doped YAG PWGs, but the poor bonding compatibility due to the CTE mismatch of sapphire and YAG has limited lengths to less than 100 mm. The NA (Numerical Aperture) of a sapphire/YAG structure is very high, around 0.5, making high gain operation difficult due to the large amount of ASE (Amplified Spontaneous Emission).

The ability to tune the index and CTE of glass materials enables the use of sapphire as the cladding material in a PWG implemented in accordance with the present teachings. Doped glass laser materials with an index close to that of sapphire have not been as widely utilized, but can be engineered. Schott, Hoya, and Ohara all produce numerous types of undoped glass with nearly exact index and CTE matches to sapphire. One of these glasses could be doped with the desired dopant by one of ordinary skill in the art using conventional teachings. Another option for a core glass compatible with sapphire claddings is the use of rare-earth doped aluminate glass. These high alumina glasses intended for use as laser gain media are less mature but they have near ideal refractive index and CTE. Both CRI and 3M have developed fabrication processes for these types of aluminate glass.

The demand for flat screen televisions and computer monitors has driven the development of processes for creating very large, very thin glass sheets. Schott has standard products with thickness in the range of 30 to 200 microns available in meter-size sheets. The ability to process glass materials into large, thin sheets with highly uniform thickness enables production of near net shape core material for the PWG of the present invention. Fabrication of the composite PWG using a thin glass sheet as the core would simply require placing the core material between two claddings and heat-treating the composite structure. This is dramatically simpler than current PWG fabrication processes in which a thick core is bonded to one cladding, then thinned to the final thickness prior to bonding the second cladding.

In any event, those skilled in the art will appreciate that the present invention provides a planar waveguide laser amplifier with a glass core and crystalline cladding that should offer the following characteristics:

Ability to be fabricated in sizes up to several meters in length at low cost due to the high maturity of thin sheet glass manufacturing processes, single crystal growth processes, and glass bonding processes Thin glass sheets developed for flat-screen TV's are available in meter long sizes Sapphire plates developed for supermarket scanner windows are available in lengths up to 2 meters using the edge defined film growth process Scalability to multi-kilowatt and even Megawatt power levels due the excellent heat removal provided by the large surface area to volume ratio of the PWG gain medium geometry and the high thermal conductivity of the crystalline cladding material 10× (Quartz) or 30× (Sapphire) higher thermal conductivity than glass claddings high optical quality due to the high index homogeneity of the glass core, high beam quality (BQ) at high output power via low distortion with athermal materials: $(n-1)\alpha = -dn/dT$, where $\alpha$ is the coefficient of thermal expansion, compatibility with glass fiber laser wavelengths enabling use of fiber pre-amps or master oscillators. (crystalline core materials are not always compatible with common fiber laser wavelengths)

Hence, the present invention combines a glass core with a crystalline cladding to enable the fabrication of planar waveguide laser amplifiers using material combinations which simplify the fabrication process and/or enable scaling to larger sizes and/or provide enhanced performance. Because the core in a planar waveguide is very thin, the thermal properties of the core have a very small impact on the overall thermal performance, which is dominated by the thermal properties of the cladding. By utilizing different materials for the core and cladding, the properties of each are optimized. Use of glass for the core allows much more flexibility in tailoring the properties of the core and the PWG geometry readily accommodates the low thermal conductivity of a glass core when the cladding is a crystalline material with higher thermal performance.

The hybrid glass-core/crystal-clad structures of the present invention offer good thermal performance and power scalability to megawatt levels. Such structures include Crystal-quartz clad Phosphate Glass and Sapphire-clad aluminate glass. High efficiency can be obtained with Nd, Yb, or Er doping and use of athermal glass can reduce phase distortion even in the presence of thermal gradients.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A planar waveguide comprising:
a substantially planar glass core; and
a crystalline cladding disposed on opposite sides of the core,
wherein the glass core has a coefficient of thermal expansion that is within 1 part per million per degree Celsius (ppm/° C.) to that of the crystalline cladding by doping the glass core,
wherein the glass core comprises a thermal conductivity at least ten times lower than a thermal conductivity of the crystalline cladding, and
wherein the glass core has a thickness less than 200 microns and has a width to thickness aspect ratio equal to or more than 50 to 1.

2. The planar waveguide of claim 1, wherein the glass core is doped with Neodymium, Ytterbium, or Erbium.

3. The planar waveguide of claim 1, wherein the cladding has a refractive index lower than that of the core.

4. The planar waveguide of claim 1, wherein a refractive index of the cladding has a uniformity of $10^{-4}$ or better.

5. The planar waveguide of claim 1, wherein the cladding has high transparency at pump and lasing wavelengths.

6. The planar waveguide of claim 1, wherein the cladding comprises Sapphire.

7. The planar waveguide of claim 6, wherein the core comprises aluminate glass.

8. The planar waveguide of claim 1, wherein the cladding comprises crystal quartz.

9. The planar waveguide of claim 8, wherein the glass core comprises Phosphate.

10. The planar waveguide of claim 1, wherein the glass core is athermal.

11. The planar waveguide of claim 1, wherein the thermal conductivity of the glass core is about thirty times lower than the thermal conductivity of the crystalline cladding.

12. The planar waveguide of claim 1, wherein the planar waveguide has a length of at least one meter.

13. The planar waveguide of claim 1, wherein a potential Optical Path Distortion (OPD) due to a thermal gradient along an axis perpendicular to a plane of the glass core is mitigated by incorporating one or more of the following properties in the planar waveguide:
(a) the glass core having a refractive index uniformity of $10^{-6}$ or better and the crystalline cladding having a refractive index uniformity of $10^{-4}$ or better; and
(b) the type of glass core and the dopant are so chosen that an effect on OPD caused by CTE (Coefficient of Thermal Expansion) is offset negatively to the same extent by an effect on OPD due to a rate of change of refractive index caused by a temperature change (dn/dT).

14. The planar waveguide of claim 1, wherein a potential Optical Path Distortion (OPD) due to a thermal gradient along an axis perpendicular to a plane of the glass core is mitigated by incorporating the following properties in the planar waveguide:
(a) the glass core has a refractive index uniformity of $10^{-6}$ or better and the crystalline cladding has a refractive index uniformity of $10^{-4}$ or better; and
(b) the type of glass core and the dopant are so chosen that an effect on OPD caused by CTE (Coefficient of Thermal Expansion) is offset negatively to the same extent by an effect on OPD due to a rate of change of refractive index caused by a temperature change (dn/dT).

15. A planar waveguide comprising:
an upper planar crystalline cladding layer;
a lower planar crystalline cladding layer parallel with the upper planar cladding layer; and
a glass core disposed between the upper and lower crystalline cladding layers, the core and the cladding layers having dissimilar indices of refraction,
wherein the glass core comprises a dopant and has a coefficient of thermal expansion that is within 1 part per million per degree Celsius (ppm/° C.) to that of the crystalline cladding layers,
wherein the glass core comprises a thermal conductivity at least ten times lower than a thermal conductivity of the crystalline cladding, and
wherein the glass core has a thickness less than 200 microns and has a width to thickness aspect ratio equal to or more than 50 to 1.

16. The planar waveguide of claim 15, wherein the dopant comprises Neodymium, Ytterbium, or Erbium.

17. The planar waveguide of claim 15, wherein the core has a refractive index uniformity of $10^{-6}$ or better.

18. The planar waveguide of claim 15, wherein each of the cladding layers has a refractive index lower than that of the core.

19. The planar waveguide of claim 18, wherein each of the cladding layers has a refractive index lower than that of the core by $10^{-4}$ to $10^{-3}$.

20. The planar waveguide of claim 19, wherein the refractive index of each of the cladding layers has a uniformity of $10^{-4}$ or better.

21. The planar waveguide of claim 15, wherein each of the cladding layers has high transparency at pump and lasing wavelengths.

22. The planar waveguide of claim 15, wherein each of the cladding layers comprises Sapphire.

23. The planar waveguide of claim 22, wherein the core comprises aluminate glass.

24. The planar waveguide of claim 15, wherein each of the cladding layers comprises crystal.

25. The planar waveguide of claim 24, wherein the glass core comprises Phosphate.

26. A method of fabricating a planar waveguide including:
providing an upper planar crystalline cladding layer;
providing a lower planar crystalline cladding layer parallel with the upper planar cladding layer;
disposing a glass core between the upper and lower crystalline cladding layers, the core and the cladding layers having dissimilar indices of refraction, the glass core having a thermal conductivity at least ten times lower than a thermal conductivity of the crystalline cladding, the glass core having a thickness less than 200 microns and has a width to thickness aspect ratio equal to or more than 50 to 1; and
tuning the glass core to have a coefficient of thermal expansion that is within 1 part per million per degree Celsius (ppm/° C.) to that of the crystalline cladding by doping the glass core.

* * * * *